(12) United States Patent
Malapati et al.

(10) Patent No.: US 11,052,855 B2
(45) Date of Patent: Jul. 6, 2021

(54) SELECTIVE DEPLOYMENT OF DEFLECTORS FOR AN AIRBAG

(71) Applicant: Ford Global Technologies, LLC, Dearborn, MI (US)

(72) Inventors: Srinivas Reddy Malapati, Novi, MI (US); Mangesh Kadam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 16/446,730

(22) Filed: Jun. 20, 2019

(65) Prior Publication Data
US 2020/0398779 A1    Dec. 24, 2020

(51) Int. Cl.
*B60R 21/02* (2006.01)
*B60R 21/231* (2011.01)
*B60R 21/206* (2011.01)
*B60R 21/0136* (2006.01)
*B60R 21/01* (2006.01)

(52) U.S. Cl.
CPC .............. *B60R 21/02* (2013.01); *B60R 21/01* (2013.01); *B60R 21/0136* (2013.01); *B60R 21/026* (2013.01); *B60R 21/206* (2013.01); *B60R 21/231* (2013.01); *B60R 2021/01211* (2013.01); *B60R 2021/01252* (2013.01); *B60R 2021/01286* (2013.01); *B60R 2021/0273* (2013.01); *B60R 2021/23169* (2013.01)

(58) Field of Classification Search
CPC ..... B60R 21/02; B60R 21/026; B60R 21/231; B60R 21/206; B60R 2021/01252; B60R 2021/23169; B60R 2021/01211; B60R 21/0136; B60R 21/01; B60R 2021/0273; B60R 2021/161
See application file for complete search history.

(56) References Cited

U.S. PATENT DOCUMENTS 4,417,750 A * 11/1983 Burry .................... B60R 21/02
                                                    280/753
5,409,260 A *  4/1995 Reuber .................. B60R 21/02
                                                    280/748

(Continued)

FOREIGN PATENT DOCUMENTS

DE      2537212 A1 *  3/1977  ............. B60R 21/02
DE   19900592 A1 *  7/2000  ........... B60R 21/233

(Continued)

*Primary Examiner* — James A English
*Assistant Examiner* — Kurtis Nielson
(74) *Attorney, Agent, or Firm* — Frank A. MacKenzie; Bejin Bieneman PLC (57) ABSTRACT

A restraint system for a vehicle includes an instrument panel and an airbag supported by the instrument panel. The restraint system includes a right deflector supported by the instrument panel adjacent the airbag. The right deflector is deployable between a retracted position and a deployed position. The restraint system includes a left deflector supported by the instrument panel adjacent the airbag opposite the right deflector in a cross-vehicle direction. The left deflector is deployable between a retracted position and a deployed position. The restraint system includes a first pyrotechnic device coupled to the right deflector and a second pyrotechnic device coupled to the left deflector.

15 Claims, 8 Drawing Sheets

(56) References Cited

U.S. PATENT DOCUMENTS

| | | | |
|---|---|---|---|
| 5,476,283 A | 12/1995 | Elton | |
| 6,186,542 B1* | 2/2001 | Enders | B60R 21/2176 280/743.1 |
| 7,210,701 B2* | 5/2007 | Meissner | B60R 21/231 280/729 |
| 7,540,531 B2 | 6/2009 | Sakakibara et al. | |
| 7,997,610 B2* | 8/2011 | Fukawatase | B60R 21/215 280/728.3 |
| 8,408,589 B2* | 4/2013 | Fukawatase | B60R 21/206 280/728.3 |
| 9,346,417 B2 | 5/2016 | Sitko | |
| 9,487,177 B2 | 11/2016 | Schneider et al. | |
| 10,077,020 B2 | 9/2018 | Raikar et al. | |
| 10,407,015 B2* | 9/2019 | Belwafa | B60R 21/23138 |
| 10,864,876 B2* | 12/2020 | Malapati | B60R 21/205 |
| 2004/0094943 A1* | 5/2004 | Fukawatase | B60R 21/045 280/753 |
| 2004/0169363 A1* | 9/2004 | Fukawatase | B60R 21/0132 280/752 |
| 2005/0062264 A1* | 3/2005 | Arwood | B60R 21/216 280/730.1 |
| 2007/0200321 A1* | 8/2007 | Heitplatz | B60R 21/233 280/730.1 |
| 2007/0222198 A1* | 9/2007 | Green | B60R 21/38 280/753 |
| 2007/0296192 A1* | 12/2007 | Sano | B60R 21/045 280/743.1 |
| 2008/0079245 A1* | 4/2008 | Bito | B60R 21/206 280/730.1 |
| 2008/0106080 A1* | 5/2008 | Fukawatase | B60R 21/2338 280/730.1 |
| 2008/0122205 A1* | 5/2008 | Imamura | B60R 21/203 280/730.1 |
| 2008/0157508 A1* | 7/2008 | Kato | B60R 21/045 280/730.1 |
| 2009/0322063 A1* | 12/2009 | Adachi | B62D 1/192 280/730.1 |
| 2010/0140904 A1* | 6/2010 | Choi | B60R 21/215 280/728.3 |
| 2011/0012329 A1* | 1/2011 | Sekino | B60R 21/215 280/730.2 |
| 2011/0156378 A1* | 6/2011 | Matsushima | B60R 21/233 280/730.1 |
| 2012/0018987 A1* | 1/2012 | Matsushima | B62D 25/145 280/730.2 |
| 2015/0061268 A1* | 3/2015 | Nagasawa | B60R 21/215 280/730.1 |
| 2016/0068131 A1* | 3/2016 | Komatsu | B60R 21/206 280/730.1 |
| 2017/0072890 A1* | 3/2017 | Jindal | B60R 21/231 |
| 2018/0118151 A1* | 5/2018 | Weerappuli | B60R 21/264 |
| 2019/0232912 A1* | 8/2019 | Campbell | B60R 21/206 |

FOREIGN PATENT DOCUMENTS

| | | | | |
|---|---|---|---|---|
| DE | 102008022823 A1 * | 11/2009 | | B60R 21/206 |
| JP | 2007131082 A | 5/2007 | | |

* cited by examiner

SELECTIVE DEPLOYMENT OF DEFLECTORS FOR AN AIRBAG

BACKGROUND

A vehicle may include one or more airbags deployable during a vehicle impact to control kinematics of occupants inside the vehicle. The airbag may be a component of an airbag assembly including a housing supporting the airbag. The airbag assembly includes an inflation device in communication with the airbag for inflating the airbag from an uninflated position to an inflated position.

DETAILED DESCRIPTION

A restraint system including an instrument panel, an airbag supported by the instrument panel, a right deflector supported by the instrument panel and being deployable from a retracted position to a deployed position, a left deflector supported by the instrument panel and being deployable from a retracted position to a deployed position, the airbag being between the right deflector and the left deflector, and a first pyrotechnic device coupled to the right deflector and a second pyrotechnic device coupled to the left deflector.

The right deflector and the left deflector may each include a panel movable between the retracted position and the deployed position.

The right deflector and the left deflector may each include a spring between the panel and the instrument panel, the springs biasing the panels toward the deployed positions.

The right deflector and the left deflector may each include a pusher rod translatable from the retracted position to the deployed position and the panel may be rotatable from the retracted position and the deployed position.

The restraint system may include a lock locking the pusher rod in the deployed position.

The restraint system may include a computer having a processor and a memory storing instructions executable by the processor to selectively deploy at least one of the right deflector or the left deflector based on a front-oblique vehicle impact.

The airbag may be a knee airbag.

A restraint system including an instrument panel, an airbag supported by the instrument panel, and a deflector supported by the instrument panel adjacent the airbag, the deflector being translatable relative to the instrument panel between a retracted position and a deployed position.

The restraint system may include a second deflector supported by the instrument panel adjacent the airbag opposite the deflector, the second deflector being translatable relative to the instrument panel between a retracted position and a deployed position.

The restraint system may include a computer having a processor and a memory storing instructions executable by the processor to selectively deploy at least one of the deflector or the second deflector based on a front-oblique vehicle impact.

The deflector may include a panel translatable from the retracted position to the deployed position and a spring biasing the panel toward the deployed position.

The restraint system may include a pyrotechnic device coupled to the deflector.

The deflector may include a pusher rod translatable from the retracted position to the deployed position and a panel rotatable from the retracted position and the deployed position.

The deflector may include a pyrotechnic device to deploy the pusher rod to the deployed position.

The airbag may include a knee airbag.

A computer including a processor and a memory storing instructions executable by the processor to detect a front-oblique vehicle impact, deploy an airbag supported by an instrument panel of the vehicle in response to the front-oblique vehicle impact, and selectively deploy at least one of a right deflector supported by the instrument panel or a left deflector supported by the instrument panel in response to the front-oblique vehicle impact.

The instructions may include instructions to deploy the right deflector in response to a right front-oblique vehicle impact and to deploy the left deflector in response to a left front-oblique vehicle impact.

With reference to the Figures, wherein like numerals indicate like parts throughout the several views, a restraint system 10 for a vehicle 12 includes an instrument panel 14 and an airbag 16 supported by the instrument panel 14. The restraint system 10 includes a right deflector 116, 216 supported by the instrument panel 14. The right deflector 116, 216 is deployable from a retracted position to a deployed position. The restraint system 10 includes a left deflector 118, 218 supported by the instrument panel 14. The left deflector 118, 218 is deployable between a retracted position and a deployed position. The airbag 16 is between the right deflector 116, 216 and the left deflector 118, 218. The restraint system 10 includes a first pyrotechnic device 122 coupled to the right deflector 116, 216 and a second pyrotechnic device 124 coupled to the left deflector 118, 218.

The right deflector 116, 216 and/or the left deflector 118, 218 may be act as reaction surfaces for the airbag 16 when the airbag 16 is in an inflated position to direct inflation and position of the airbag 16 during a vehicle impact, e.g., in the event of a front-oblique vehicle impact. Specifically, the right deflector 116, 216 and the left deflector 118, 218 in the deployed position protrude away from the instrument panel 14 and abut the airbag 16 in the inflated position. The right deflector 116, 216 positions a right side of the airbag 16 in the deployed position and the left deflector 118, 218 positions a left side of the airbag 16 in the deployed position. In the example of a front-oblique vehicle impact, the right deflector 116, 216 and/or or the left deflector 118, 218 may deploy to control the kinematics of an occupant in the direction of the impact.

Figure 1:
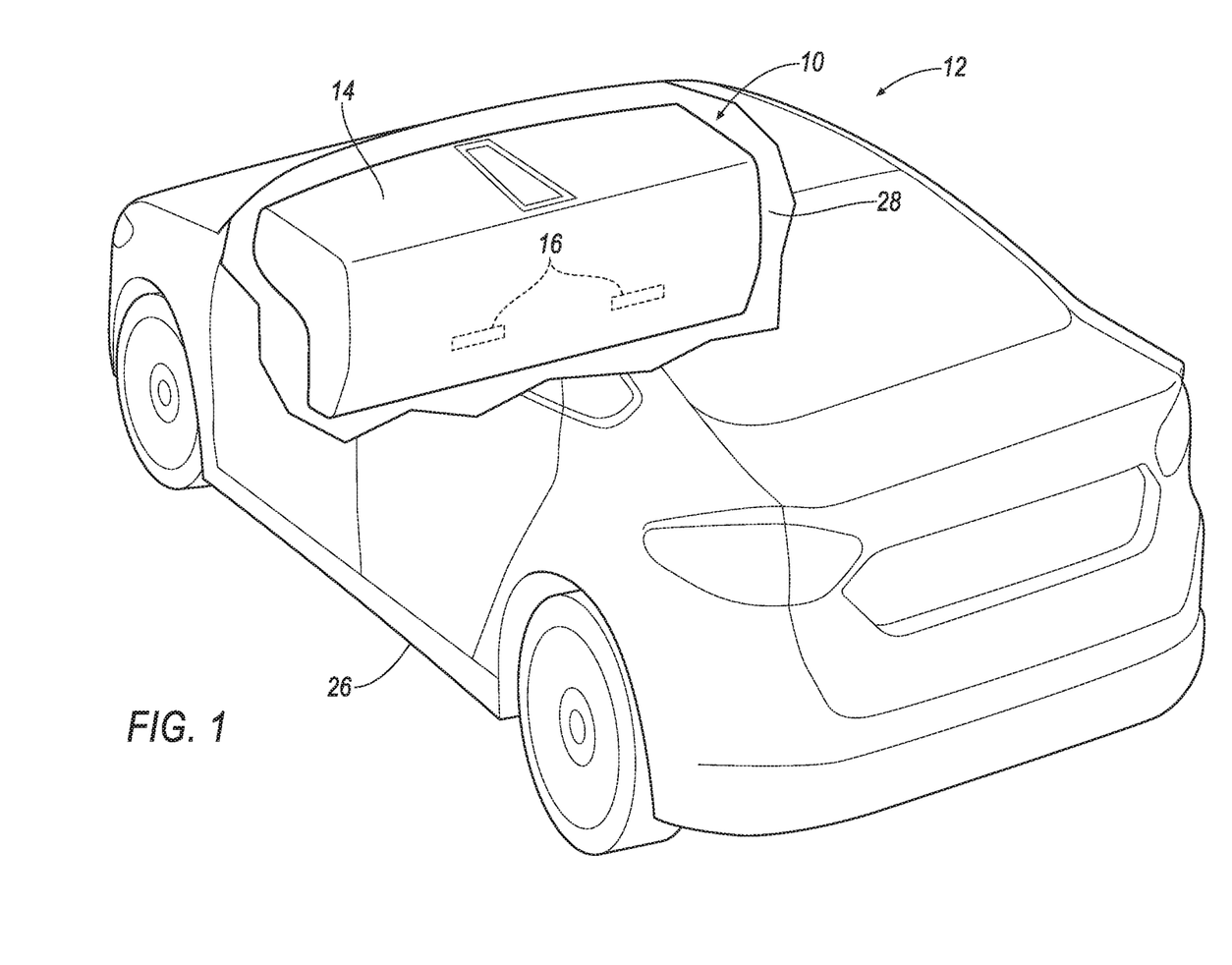
FIG. 1 is a perspective view of a vehicle including a restraint system having an instrument panel, two airbags, and a right deflector and a left deflector supported by the instrument panel on both sides of each airbag.
Figure 2A:
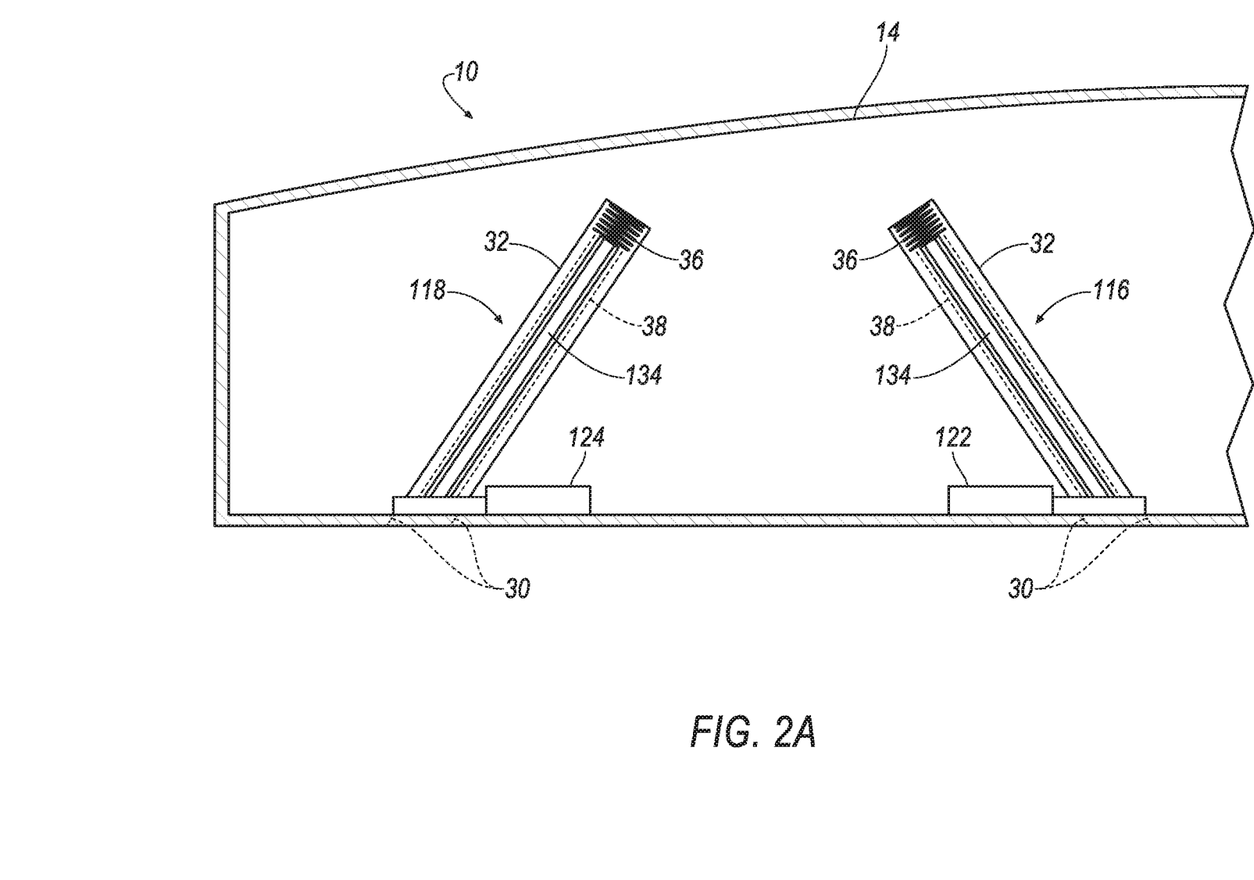
FIG. 2A is a cross-sectional view of the instrument panel and one embodiment of the right deflector and the left deflector in a retracted position.
Figure 2B:
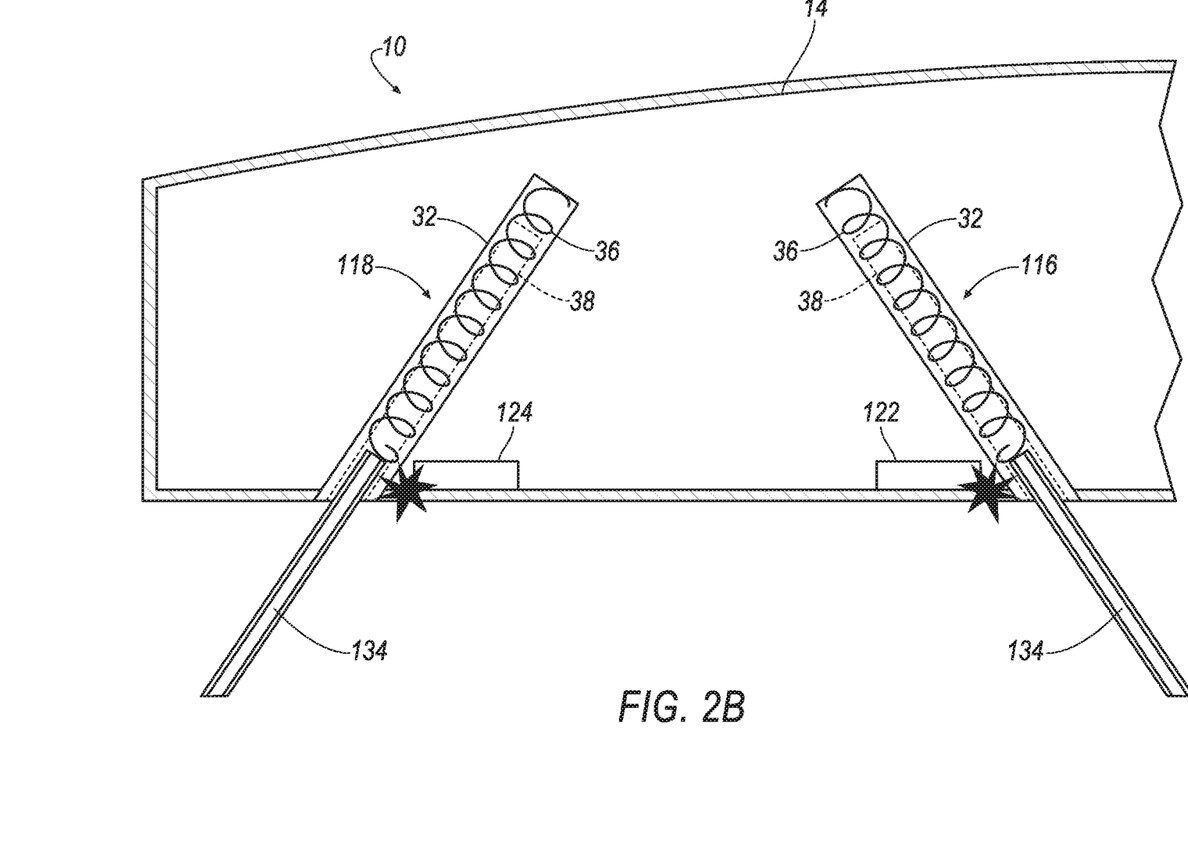
FIG. 2B is a top cross-sectional view of the instrument panel with the right deflector and the left deflector of FIG. 2A in a deployed position.
Figure 3A:
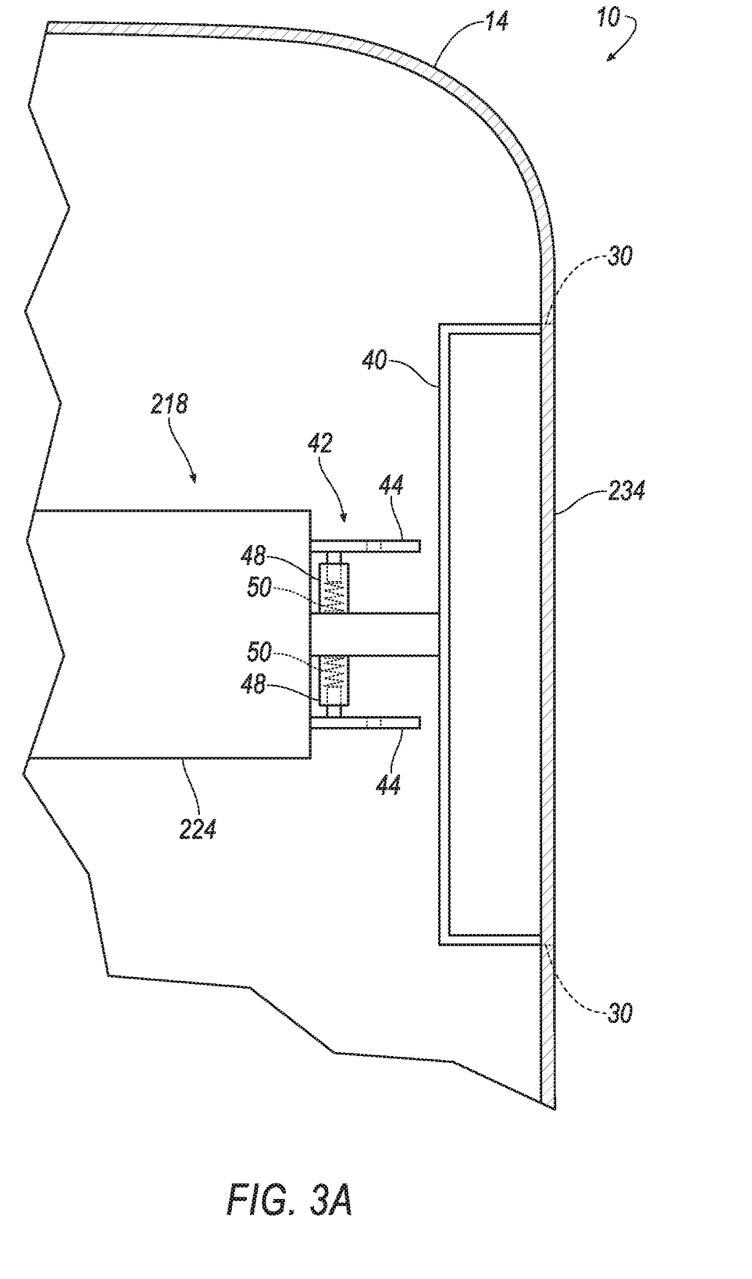
FIG. 3A is a cross-sectional view of the instrument panel with another embodiment of the deflector including a push rod supported by the instrument panel in a retracted position.
Figure 3B:
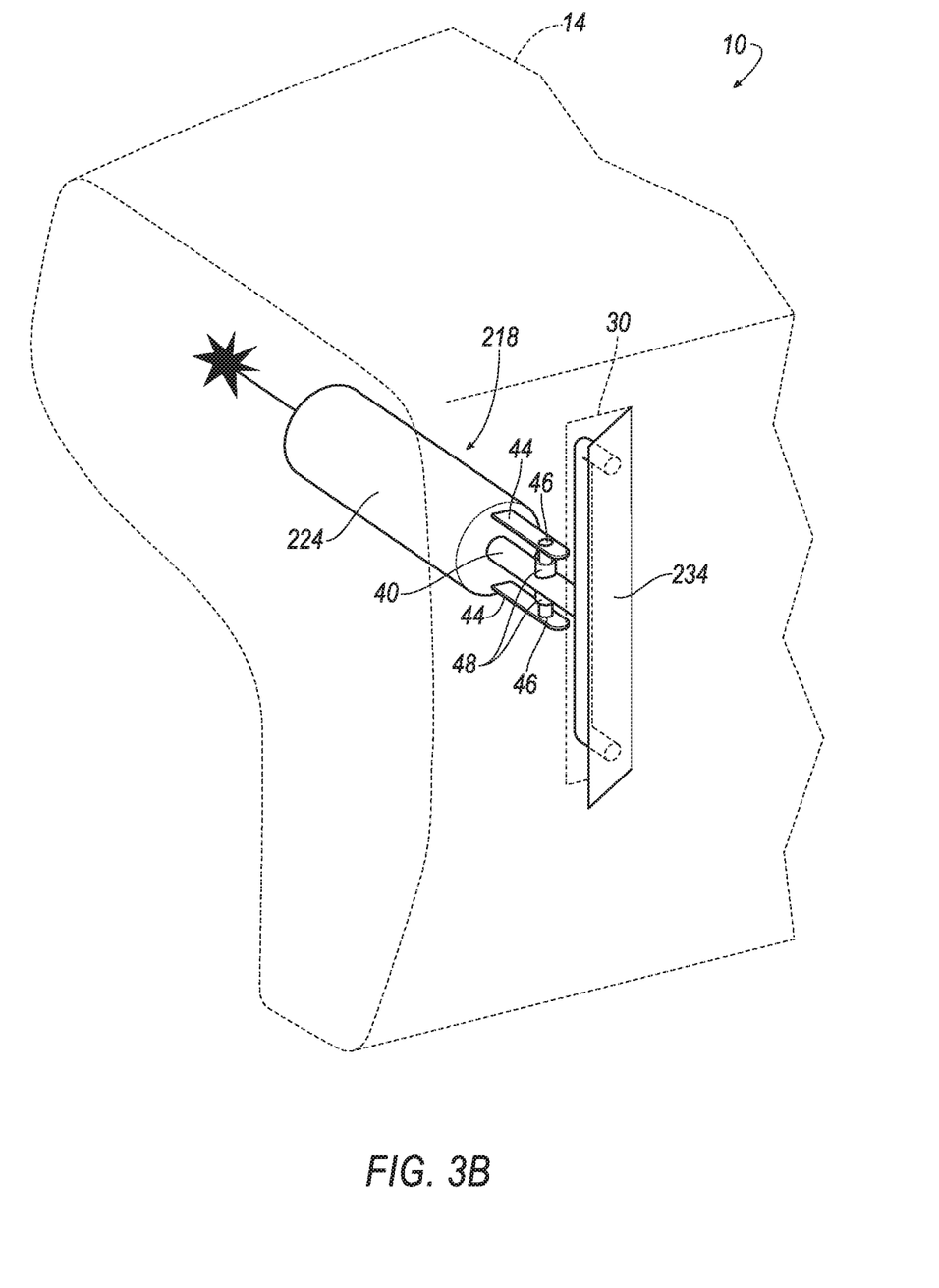
FIG. 3B is a perspective of the instrument panel with the deflector of FIG. 3A in a deployed position.

One embodiment of the right deflector 116 and left deflector 118 is shown in FIGS. 2A-2B and another embodiment of the right deflector 216 and left deflector 218 is shown in FIGS. 3A-3B. As described in greater detail below, in the embodiment in FIGS. 2A-B, the right deflector 116 and the left deflector 118 translate from the retracted position to the deployed position and, in the embodiment in FIGS. 3A-B, the right deflector 216 and the left deflector 218 translate and rotate from the retracted position to the deployed position. Common numerals are used to identify common features in the embodiments. FIGS. 4A-D are schematic diagrams showing the operation of both embodiments.

The vehicle 12 may be any type of vehicle 12 such as a car, a truck, a sport utility vehicle, a crossover vehicle, a van, a minivan, a taxi, a bus, airplane, boat, rail car, subway, etc. The vehicle 12 may be operable in an autonomous mode, a semi-autonomous mode, and/or a non-autonomous mode. The vehicle 12 may include a computer to operate the vehicle 12 in an autonomous mode and/or a semi-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering. The vehicle 12 may be, for example, a ride-sharing vehicle.

In examples in which the vehicle 12 is operable in the autonomous mode, the vehicle 12 may be without a steering wheel, and in such an example, the vehicle 12 may include two sets of airbags 16 and deflectors 116, 216, 118, 218, e.g., one in front of a left front seat and another in front of a right front seat. In an example in which the vehicle 12 includes a steering wheel, the vehicle 12 may have one airbag 16 and pair of deflectors 116, 216, 118, 218, e.g., in front of a passenger seat. The vehicle 12 may have any suitable number of airbags 16 and deflectors 116, 216, 118, 218 in any suitable position.

The vehicle 12 includes a body 26. The body 26 defines a passenger compartment 28 to house occupants, if any, of the vehicle 12.

The vehicle 12 may include one or more seats disposed in the passenger compartment 28. The vehicle 12 may include any suitable number of seats in any suitable position, e.g., front seats, back seats, left side, right side, etc. The position and orientation of the seats and components thereof may be adjustable. The vehicle 12 may include one or more seats that may be positioned at a front of the passenger compartment 28 facing the instrument panel 14, and the airbag 16 and the right deflector 116, 216 and left deflector 118, 218 are positioned to be aligned with such a seat, i.e., such that the airbag 16 receives the occupant during a front-oblique vehicle impact. As set forth above, the vehicle 12 may include any suitable number of sets of airbags 16 and deflectors 116, 216, 118, 218, e.g., one for each seat able to be positioned at the front of the passenger compartment 28 facing the instrument panel 14.

The instrument panel 14 may be disposed at the forward end of the passenger compartment 28. The instrument panel 14 may be supported by the body 26. The instrument panel 14 may include vehicle controls, e.g., radio controls, climate control buttons, vehicle cluster, storage compartments, etc. The instrument panel 14 may have a class-A surface, i.e., a surface specifically manufactured to have a high-quality, finished aesthetic appearance free of blemishes.

The restraint system 10 may include an airbag module. The airbag module may include an airbag housing, an inflator, and the airbag 16. The inflator and the airbag 16 may be disposed in the airbag housing. The airbag housing may be supported by the instrument panel 14. The airbag housing may be of any material, e.g., a rigid polymer, a metal, a composite, etc. The airbag module may be positioned to be a knee airbag module or in any other suitable position in the instrument panel 14.

The inflator may be fluidly connected to the airbag 16. Upon receiving a signal from, e.g., the computer, the inflator may inflate the airbag 16 to the inflated position with an inflatable medium, such as a gas. The inflator may be, for example, a pyrotechnic inflator that uses a chemical reaction to drive inflation medium to the airbag 16. The inflator may be of any suitable type, for example, a cold-gas inflator.

The airbag 16 is supported by the instrument panel 14. For example, the airbag 16 may be mounted to the instrument panel 14, e.g., via the airbag housing. The airbag 16 is between the right deflector 116, 216 and the left deflector 118, 218. Specifically, the right deflector 116, 216 and the left deflector 118, 218 are on opposite sides of the airbag 16 in the cross-vehicle direction. The airbag 16 is inflatable between an uninflated position and an inflated position. The inflator inflates the airbag 16 to the inflated position in the event of a vehicle impact.

The airbag 16 may be a woven polymer or any other material. As one example, the airbag 16 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

As set forth above, the right deflector 116, 216 and the left deflector 118, 218 are each supported by the instrument panel 14. In the retracted position, the deflectors 116, 216, 118, 218 are concealed behind the class-A surface of the instrument panel 14 and may not be visible from inside the passenger compartment 28. In the event of a front-vehicle oblique impact, the deflectors 116, 216, 118, 218 may deploy from the retracted position to the deployed position. In the deployed position, the deflectors 116, 216, 118, 218 extend outwardly from the instrument panel 14, i.e., toward the seats in the passenger compartment 28. The deflectors 116, 216, 118, 218 may extend angularly outward from the instrument panel 14. The deflectors 116, 216, 118, 218 are of a rigid material relative to the airbag 16, e.g., polymeric material. The instrument panel 14 may have tear seams 30 that are torn by the airbag 16, the right deflector 116, 216, and/or the left deflector 118, 218 during deployment allowing the airbag 16, the right deflector 116, 216, and/or the left deflector 118, 218 to protrude from the instrument panel 14.

The deflectors 116, 216, 118, 218 are supported by the instrument panel 14. For example, the instrument panel 14 may have a cavity 32 receiving the deflectors 116, 216, 118, 218. The deflectors 116, 216, 118, 218 are supported by the instrument panel 14 adjacent the airbag 16 with the right deflector 116, 216 being on a side of the airbag 16 opposite the left deflector 118, 218. In one example, the right deflector 116, 216 may be supported by the instrument panel 14 on a right side of the airbag 16 and the left deflector 118, 218 may be supported by the instrument panel 14 on a left side of the airbag 16, i.e., the airbag 16 is between the deflectors 116, 216, 118, 218.

Figure 4A:
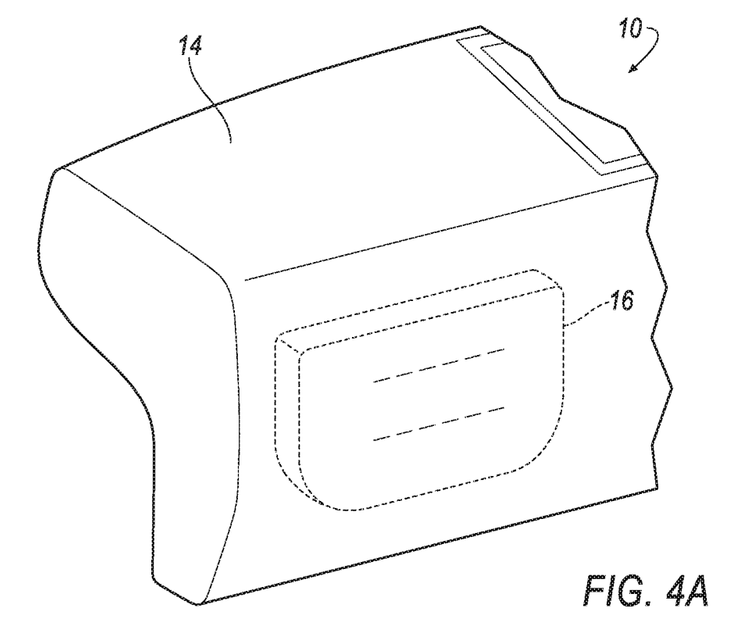
FIG. 4A is a perspective view of the instrument panel with the airbag in an inflated position.
Figure 4B:
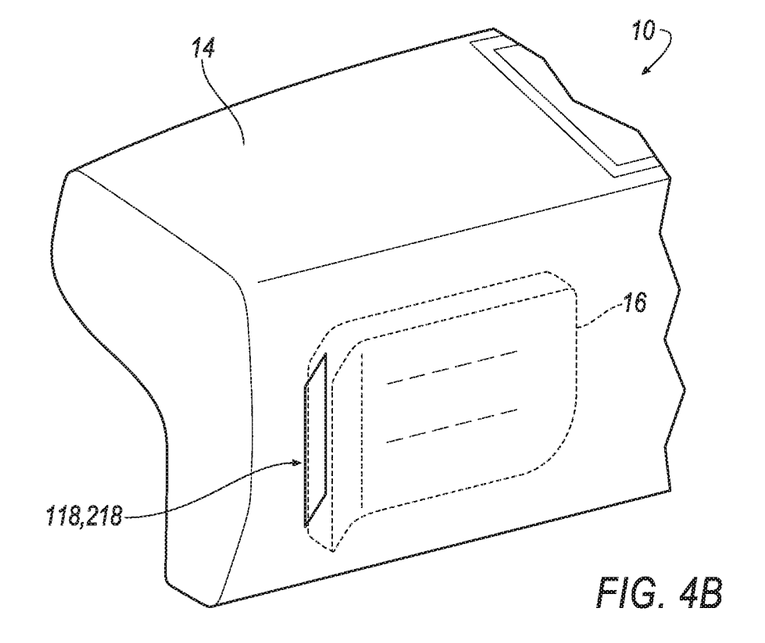
FIG. 4B is a perspective view of the instrument panel with the airbag in the inflated position with the left deflector in the deployed position.
Figure 4C:
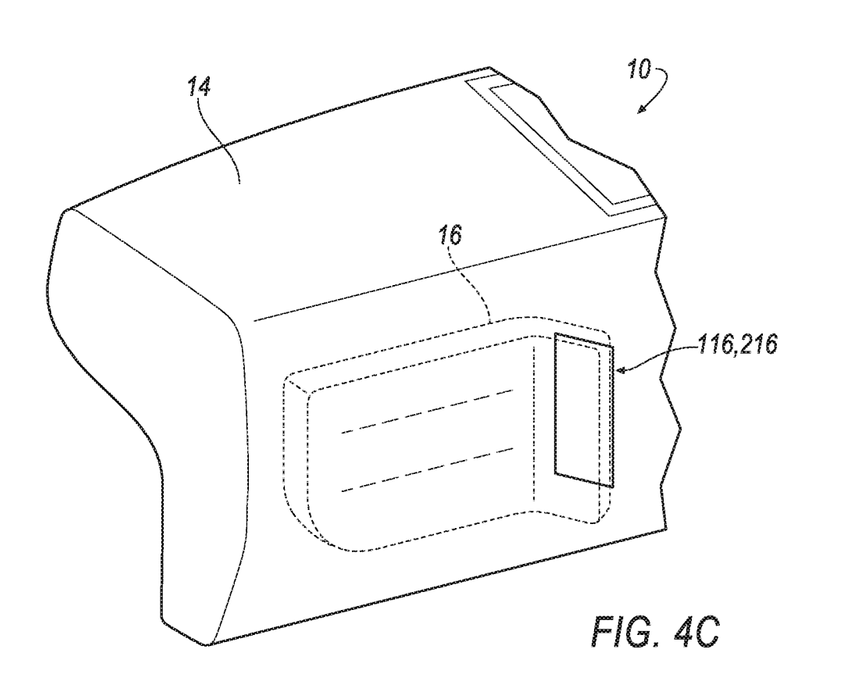
FIG. 4C is a perspective view of the instrument panel with the airbag in the inflated position with the right deflector in the deployed position.
Figure 4D:
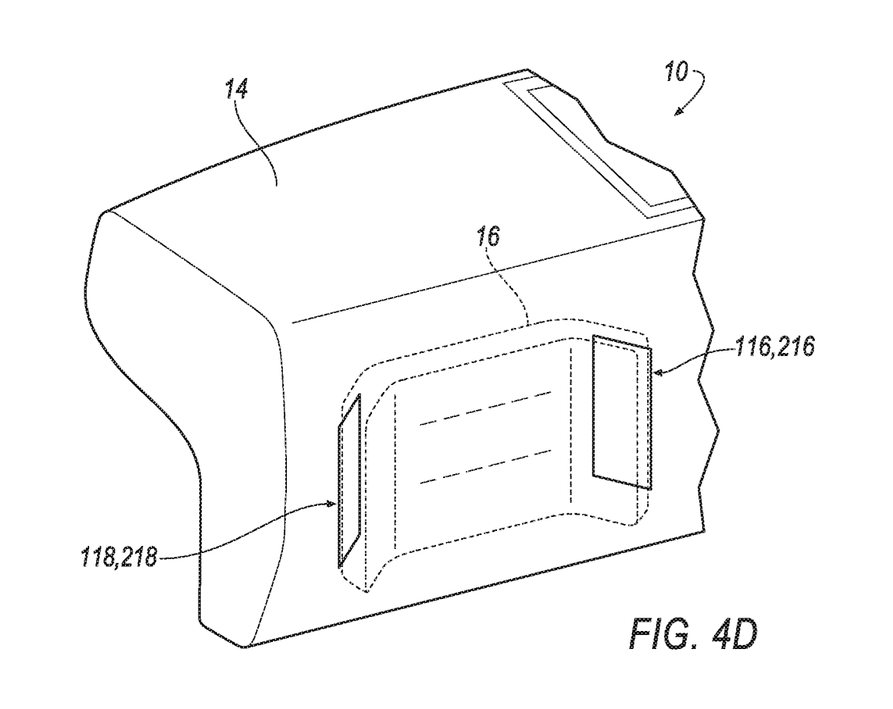
FIG. 4D is a perspective view of the instrument panel with the airbag in the inflated position with the left deflector and the right deflector both in the deployed position.

When the airbag 16 is inflated, neither deflector 116, 216, 118, 218, one deflector 116, 216, 118, 218, or both deflectors 116, 216, 118, 218 may be deployed. FIG. 4A shows the airbag 16 in the inflated position with the right deflector 116, 216 and the left deflector 118, 218 in the retracted positions. FIG. 4B shows the airbag 16 in the inflated position and the left deflector 118, 218 in the deployed position deflecting the position of a left side of the airbag 16, i.e., the left deflector 118, 218 acting as a reaction surface for the left side of the airbag 16. The right deflector 116, 216 is in the retracted position in FIG. 4B. FIG. 4C shows the airbag 16 in the inflated position and the right deflector 116, 216 in the deployed position deflecting the position of a right side of the airbag 16, i.e., the left deflector 118, 218 acting as a reaction surface for the right side of the airbag 16. The left deflector 118, 218 is in the retracted position in FIG. 4C. FIG. 4D shows the airbag 16 in the inflated position and the right deflector 116, 216 and the left deflector 118, 218 both in the deployed position deflecting the position of the right side and the left side, respectively, of the airbag 16.

With reference to the embodiment shown in FIGS. 2A-2B, the deflectors 116, 118 are translatable relative to the instrument panel 14 between the retracted position and the deployed position. The deflectors 116, 118 in FIGS. 2A-2B are not rotatable relative to the instrument panel 14. The right deflector 116 and the left deflector 118 may each include a panel 134 movable between the retracted position and the deployed position. The panel 134 is elongated in a vehicle vertical direction. The panel 134 may be translatable between the retracted position and the deployed position. The panels 134 in the deployed position may extend from the instrument panel 14 at a non-right angle, e.g., an angle having a vehicle-rearward component and a cross-vehicle component. The panels 134 in the deployed position may angle away from each other.

The deflectors 116, 118 may be spring-loaded. In this example, the deflectors 116, 118 may each include a spring 36 between the instrument panel 14 and the panel 134. The spring 36 may bias the panel 134 away from the retracted position and toward the deployed position, i.e., the spring 36 is in a compressed state when the panel 134 is in the retracted position. When the deflector 116, 118 is released, e.g., by activation of the pyrotechnic device as described below, the spring 36 decompresses to move the panel 134 from the retracted position to the deployed position.

The instrument panel 14 may define a cavity 32 that supports the deflector 116,118. The cavity 32 may support the panel 134 of the deflector 116, 118. The panel 134 may be disposed inside the cavity 32 in the retracted position and extendable from the cavity 32 in the deployed position. In such an example, the spring 36 is disposed in the cavity 32 between the instrument panel 14 and the panel 134.

With continued reference to FIGS. 2A and 2B, the deflector 116, 118 may include a track 38 between the instrument panel 14 and the panel 134. The track 38 may be disposed in the cavity 32. The panel 134 may be fixed to the track 38 with the panel 134 being translatable along the track 38 from the retracted position to the deployed position. The track 38 may be a slide rail or any other type of track 38 that will allow the panel 134 to translate between the retracted position and the deployed position.

With continued reference to FIGS. 2A and 2B, the first pyrotechnic device 122 may be coupled to the right deflector 116 and the second pyrotechnic device 124 may be coupled to the left deflector 118. Specifically, the first pyrotechnic device 122 may be operatively coupled to the right deflector 116 and the second pyrotechnic device 124 may be operatively coupled to the left deflector 118. When the pyrotechnic devices 122, 124 are activated, e.g., by a signal from the computer indicating a front-vehicle oblique impact, the pyrotechnic devices 122, 124 deploy the deflectors 116, 118 to translate away from the retracted position and toward the deployed position. The panels 134 of the deflectors 116, 118 move from the retracted position to the deployed position when the pyrotechnic devices 122, 124 have been actuated. Specifically, the pyrotechnic device may be configured to retain the deflector in the retracted position. For example, the pyrotechnic device may be supported by the instrument panel 14 and engaged with the panel 134 to retain the panel 134 in the retracted position. The pyrotechnic device may be in the cavity 32 and obstruct movement of the panel 134 from the cavity 32 to retain the spring 36 in the compressed state. When the pyrotechnic devices 122, 124 are activated, the pyrotechnic device releases the panel 134 to allow the bias of the spring 36 to move the panel 134 to translate the panel 134 from the retracted position to the deployed position. For example, the pyrotechnic device may disengage the panel 134, e.g., by fracture, retraction, etc.

In the embodiment shown in FIGS. 3A-3B, the deflectors 216, 218 translate and rotate relative to the instrument panel 14. Specifically, the deflector 216, 218 includes a pusher rod 40 that translates relative to the instrument panel 14 and a panel 234 that rotates relative to the instrument panel 14. The panel 234 is elongated in the vehicle vertical direction. The pyrotechnic device is fixed to the instrument panel 14 and is designed to push the pusher rod 40 so that the pusher rod 40 translates and causes the panel 234 to rotate.

With continued reference to FIGS. 3A-3B, the panel 234 may be a part of the instrument panel 14. For example, the panel 234 may be hinged to the rest of the instrument panel 14 at a hinge. The panel 234 may also be connected to the rest of the instrument panel 14 with tear seams 30 that are configured to break when the deflector 216, 218 is deployed.

The pusher rod 40 translates relative to the instrument panel 14. The pusher rod 40 may extend from the pyrotechnic device to the panel 234. When the pyrotechnic device is activated, the pyrotechnic charge pushes the pusher rod 40 with a force significant enough to tear the tear seams 30 and rotate the panel 234 about the hinge.

With continued reference to FIGS. 3A and 3B, the deflectors 216, 218 may each include a lock 42 that locks the pusher rod 40 into the deployed position after the pyrotechnic devices 222, 224 are activated, i.e., preventing the panel 234 from returning the retracted position after being deployed to the deployed position. The lock 42 includes a pair of rails 44 extending from the pyrotechnic device parallel to a straight portion of the pusher rod 40. Each rail defines a hole 46 spaced from the pyrotechnic device. A pair of lock pins 48 extend between the pusher rod 40 and the rails 44. The lock pins 48 may be spring loaded, i.e., the lock pins 48 may include a spring 50 biasing the lock pin toward the rails 44. When the pyrotechnic devices 222, 224 are actuated, and the pusher rod 40 translates to the deployed position, the lock pins 48 travel along the rails 44 until engaging with the holes 46 in the rails 44. When the lock pins 48 are engaged with the holes 46, the pusher rod 40 is stationary in the deployed position, i.e., the pusher rod 40 may not return to the retracted position.

In the examples in FIGS. 2A-3B, the pyrotechnic device may be of any suitable type. The pyrotechnic device has a pyrotechnic charge in a canister. The pyrotechnic charge may be combustible to produce a gas. The pyrotechnic charge may be a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The restraint system 10 may include a plurality of impact sensors at the front of the vehicle 12. The impact sensors may be in communication with the computer. The impact sensors are programmed to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors may be located at numerous points in or on the vehicle 12 and there may be any suitable number of impact sensors.

As set forth above, the vehicle 12 may include the computer, as described above. The computer, implemented via circuits, chips, or other electronic components, is included in a vehicle control system for carrying out various operations, including as described herein. The computer is a computing device that generally includes a processor and a memory, the memory including one or more forms of computer-readable media and storing instructions executable by the processor for performing various operations, including as disclosed herein. The memory of the computer further generally stores remote data received via various communications mechanisms; e.g., the computer is generally configured for communications on a controller area network (CAN) bus or the like, and/or for using other wired or wireless protocols, e.g., Bluetooth, etc. The computer may also have a connection to an onboard diagnostics connector (OBD-II). Via a communication network using Ethernet, WiFi, the CAN bus, Local Interconnect Network (LIN), and/or other wired or wireless mechanisms, the computer may transmit messages to various devices in the vehicle 12 and/or receive messages from the various devices, e.g., controllers, actuators, sensors, etc., e.g., controllers and sensors as discussed herein. For example, the computer may receive data from vehicle sensors.

The communication network includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer may be in communication with the communication network of the vehicle 12 to send and/or receive instructions to and from components of the vehicle 12. The computer may be a microprocessor-based controller implemented via circuits, chips, or other electronic components. For example, the computer may include the processor, memory, etc. The memory of the computer may include memory storing instructions executable by the processor as well as for electronically storing data and/or databases.

The computer includes the processor and the memory stores instructions executable by the processor to selectively deploy at least one of the deflectors 116, 216, 118, 218 and the airbag 16 in response to detection of a front-oblique vehicle impact. The memory stores instructions executable by the processor to perform the method 500 shown in FIG. 5. Specifically, upon determining which side of the vehicle 12 the impact has occurred, the deflector 116, 216, 118, 218 corresponding to that side may be deployed, i.e., if the front-oblique vehicle impact occurs on a right side of the vehicle 12, the right deflector 116, 216 may deploy and if the front-oblique vehicle impact occurs on a left side of the vehicle 12, the left deflector 118, 218 may deploy.

Figure 5:
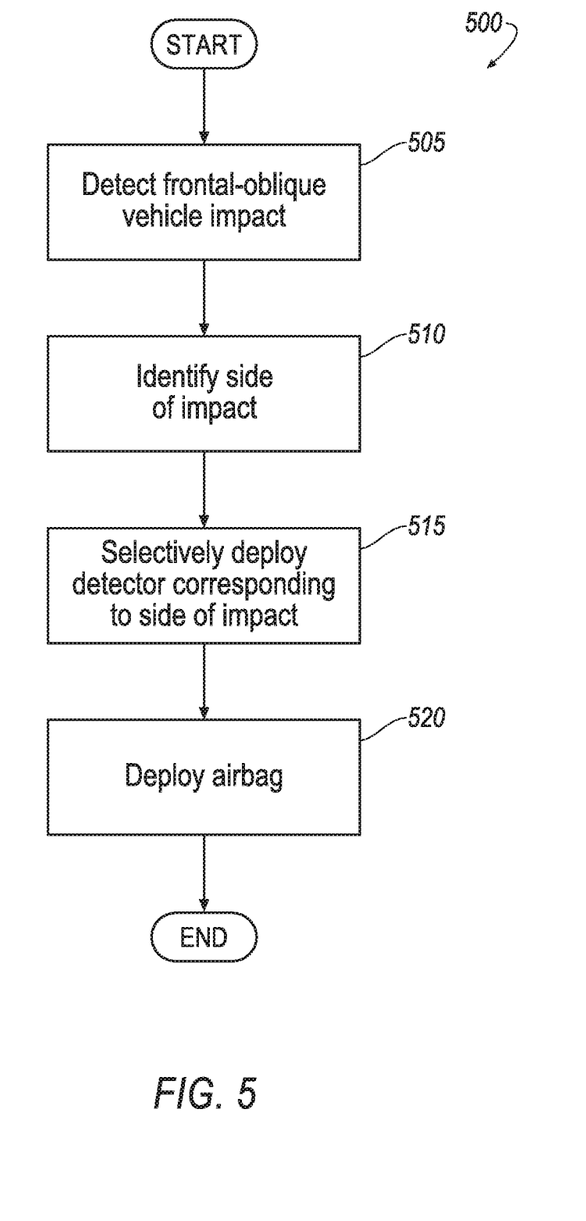
FIG. 5 is a flowchart for selective deployment of the right deflector and/or the left deflector in response to a front-oblique vehicle impact.

With reference to block 505 in FIG. 5, the memory stores instructions executable by the processor to detect a front-oblique vehicle impact. The impact may be detected by the impact sensors located at the front of the vehicle 12.

With reference to block 510, the instructions may include instructions to identify the side on which the front-oblique vehicle impact occurred. The identification of the side may be detected by the impact sensors at the front of the vehicle 12.

With reference to block 515, the instructions may include instructions to selectively deploy at least one of the right deflector 116, 216 or the left deflector 118, 218 in response to the front-oblique vehicle impact. The deflector 116, 216, 118, 218 deployed may be corresponding with the side on which the front-oblique vehicle impact has been detected by the impact sensors. The instructions may include instructions to deploy the right deflector 116, 216 in response to a right front-oblique vehicle impact and to deploy the left deflector 118, 218 in response to a left front-oblique vehicle impact. The instructions may include instructions to deploy both the right deflector 116, 216 and the left deflector 118, 218 in response to the front-oblique vehicle impact. The instructions may include instructions to deploy only the right deflector 116, 216 in response to the front-oblique vehicle impact. The instructions may include instructions to deploy only the left deflector 118, 218 in response to the front-oblique vehicle impact. The instructions may include instructions to deploy both the right deflector 116, 216 and the left deflector 118, 218.

With reference to block 520, the instructions may include instructions to deploy the airbag 16 in response to the front-oblique vehicle impact. The impact sensor may send a signal to the inflator to deploy the airbag 16 and inflate the airbag 16 to the inflated position.

Use of "in response to" and "upon determining" herein indicates a causal relationship, not merely a temporal relationship. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
    an instrument panel;
    an airbag supported by the instrument panel;
    a right deflector supported by the instrument panel and being deployable from a retracted position to a deployed position;
    a left deflector supported by the instrument panel and being deployable from a retracted position to a deployed position;
    the airbag being between the right deflector and the left deflector; and
    a first pyrotechnic device operatively coupled to the right deflector to deploy the right deflector from the retracted position toward the deployed position and a second pyrotechnic device operatively coupled to the left deflector to deploy the left deflector from the retracted position toward the deployed position.

2. The restraint system of claim 1, wherein the right deflector and the left deflector each include a panel movable between the retracted position and the deployed position.

3. The restraint system of claim 2, wherein the right deflector and the left deflector each include a spring between the panel and the instrument panel, the springs biasing the panels toward the deployed positions.

4. The restraint system of claim 2, wherein the right deflector and the left deflector each include a pusher rod translatable from the retracted position to the deployed position and the panel is rotatable from the retracted position and the deployed position.

5. The restraint system of claim 4, further comprising a lock locking the pusher rod in the deployed position.

6. The restraint system of claim 1, further comprising a computer having a processor and a memory storing instructions executable by the processor to selectively deploy at least one of the right deflector or the left deflector based on a front-oblique vehicle impact.

7. The restraint system of claim 1, wherein the airbag is a knee airbag.

8. A restraint system comprising:
an instrument panel;
an airbag supported by the instrument panel;
a deflector supported by the instrument panel adjacent the airbag, the deflector being translatable relative to the instrument panel between a retracted position and a deployed position;
a second deflector supported by the instrument panel adjacent the airbag opposite the deflector, the second deflector being translatable relative to the instrument panel between a retracted position and a deployed position; and
a computer having a processor and a memory storing instructions executable by the processor to selectively deploy at least one of the deflector or the second deflector based on a front-oblique vehicle impact.

9. The restraint system of claim 8, wherein the deflector includes a panel translatable from the retracted position to the deployed position and a spring biasing the panel toward the deployed position.

10. The restraint system of claim 9, further comprising a pyrotechnic device coupled to the deflector.

11. The restraint system of claim 8, wherein the deflector includes a pusher rod translatable from the retracted position to the deployed position and a panel rotatable from the retracted position and the deployed position.

12. The restraint system of claim 11, wherein the deflector includes a pyrotechnic device to deploy the pusher rod to the deployed position.

13. The restraint system of claim 8, wherein the airbag is a knee airbag.

14. A computer comprising a processor and a memory storing instructions executable by the processor to:
detect a front-oblique vehicle impact;
deploy an airbag supported by an instrument panel of the vehicle in response to the front-oblique vehicle impact; and
selectively deploy at least one of a right deflector adjacent the airbag and supported by the instrument panel or a left deflector adjacent the airbag opposite the right deflector and supported by the instrument panel in response to the front-oblique vehicle impact.

15. The computer of claim 14, wherein the instructions include instructions to deploy the right deflector in response to a right front-oblique vehicle impact and to deploy the left deflector in response to a left front-oblique vehicle impact.

* * * * *